(12) United States Patent
Lee et al.

(10) Patent No.: US 12,435,191 B2
(45) Date of Patent: Oct. 7, 2025

(54) SUPER ABSORBENT POLYMER AND METHOD FOR PREPARING SAME

(71) Applicant: LG Chem, Ltd., Seoul (KR)

(72) Inventors: Junwye Lee, Daejeon (KR); Chang Hun Lee, Daejeon (KR); Kwangin Shin, Daejeon (KR); Chang Hun Han, Daejeon (KR); Sang Gi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1079 days.

(21) Appl. No.: 16/962,947

(22) PCT Filed: Dec. 6, 2018

(86) PCT No.: PCT/KR2018/015429
§ 371 (c)(1),
(2) Date: Jul. 17, 2020

(87) PCT Pub. No.: WO2019/143020
PCT Pub. Date: Jul. 25, 2019

(65) Prior Publication Data
US 2021/0179790 A1  Jun. 17, 2021

(30) Foreign Application Priority Data
Jan. 19, 2018 (KR) .................. 10-2018-0007384

(51) Int. Cl.
C08F 20/06 (2006.01)
C08J 3/075 (2006.01)
C08J 3/12 (2006.01)
C08J 3/14 (2006.01)
C08J 3/24 (2006.01)

(52) U.S. Cl.
CPC .............. *C08J 3/245* (2013.01); *C08F 20/06* (2013.01); *C08J 3/075* (2013.01); *C08J 2205/022* (2013.01); *C08J 2333/08* (2013.01); *C08J 2333/10* (2013.01)

(58) Field of Classification Search
CPC ............................................ C08J 2205/022
See application file for complete search history.

(56) References Cited

U.S. PATENT DOCUMENTS

| | | |
|---|---|---|
| 6,444,744 B1 | 9/2002 | Fujimaru et al. |
| 8,697,779 B2 | 4/2014 | Losch et al. |
| 9,433,921 B2 | 9/2016 | Ryu et al. |
| 2009/0131255 A1 | 5/2009 | Ikeuchi et al. |
| 2010/0035059 A1 | 2/2010 | Losch et al. |
| 2010/0261850 A1 | 10/2010 | Mitsukami et al. |
| 2010/0323885 A1 | 12/2010 | Herfert et al. |
| 2011/0003926 A1 | 1/2011 | Nogi et al. |
| 2011/0117245 A1 | 5/2011 | Engstrom et al. |
| 2011/0237735 A1 | 9/2011 | Funk et al. |
| 2012/0184670 A1 | 7/2012 | Kobayashi et al. |
| 2013/0158495 A1 | 6/2013 | Handa et al. |
| 2015/0093575 A1 | 4/2015 | Naumann et al. |
| 2015/0119531 A1 | 4/2015 | Bauduin et al. |
| 2015/0307667 A1 | 10/2015 | Wada et al. |
| 2015/0322180 A1 | 11/2015 | Matsumoto et al. |
| 2016/0083533 A1 | 3/2016 | Imura et al. |
| 2016/0175813 A1* | 6/2016 | Ryu ................ C08J 3/12 502/402 |
| 2016/0235882 A1* | 8/2016 | Noh ................ A61L 15/60 |
| 2016/0236803 A1 | 8/2016 | Torii et al. |
| 2017/0354952 A1 | 12/2017 | Kim et al. |
| 2018/0147557 A1* | 5/2018 | Hwang ............ B01J 20/103 |
| 2019/0135993 A1 | 5/2019 | Daniel et al. |
| 2019/0276609 A1* | 9/2019 | Lee ................ C08J 3/24 |
| 2019/0308171 A1* | 10/2019 | Kim ................ C08J 3/245 |
| 2020/0216623 A1* | 7/2020 | Ahn ................ C08J 3/124 |
| 2020/0317872 A1 | 10/2020 | Wada et al. |
| 2023/0149898 A1* | 5/2023 | Lee ................ C08F 220/06 502/402 |

FOREIGN PATENT DOCUMENTS

| | | |
|---|---|---|
| CN | 101605819 A | 12/2009 |
| CN | 103080139 A | 5/2013 |
| CN | 103347548 A | 10/2013 |
| CN | 104411732 A | 3/2015 |
| CN | 104936997 A | 9/2015 |
| EP | 2028217 A1 | 2/2009 |
| EP | 2484439 A1 | 8/2012 |
| EP | 2927266 A1 | 10/2015 |
| JP | 2000212372 A | 8/2000 |
| JP | 2005054151 A | 3/2005 |
| JP | 2010520948 A | 6/2010 |
| JP | 2011092930 A | 5/2011 |

(Continued)

OTHER PUBLICATIONS

Search Report dated Sep. 22, 2022 from Office Action for Chinese Application No. 201880085690.1 issued Oct. 8, 2022. 3 pgs.
Search Report from Japanese Application No. 2020-539220 dated Aug. 23, 2021. 17 pgs.
Fredric L. Buchholz et al., Modern Superabsorbent Polymer Technology, 1998, 6 pages.
George Odian, Principles of Polymerization, Second Edition, 1981, p. 203.
International Search Report for Application No. PCT/KR2018/015429, mailed Mar. 15, 2019, pp. 1-3.

(Continued)

*Primary Examiner* — Melissa A Rioja

(74) *Attorney, Agent, or Firm* — Lerner David LLP

(57) ABSTRACT

The present disclosure relates to a super absorbent polymer having a high water content and a method for preparing the same. The super absorbent polymer according to the present disclosure has a relatively high water content compared to a conventional one but has no degradation in absorption-related physical properties, and thereby can be used in various fields.

7 Claims, No Drawings

(56) References Cited

FOREIGN PATENT DOCUMENTS

| | | | |
|---|---|---|---|
| JP | 2014505151 | A | 2/2014 |
| JP | 2015521678 | A | 7/2015 |
| JP | 2016094625 | A | 5/2016 |
| KR | 100363147 | B1 | 12/2002 |
| KR | 20140102264 | A | 8/2014 |
| KR | 20150090067 | A | 8/2015 |
| KR | 20150091363 | A | 8/2015 |
| KR | 20160006189 | A | 1/2016 |
| KR | 101728490 | B1 | 4/2017 |
| KR | 20170052480 | A | 5/2017 |
| KR | 20170096322 | A | 8/2017 |
| WO | 2009048160 | A1 | 4/2009 |
| WO | 2009113671 | A1 | 9/2009 |
| WO | 2012107432 | A1 | 8/2012 |
| WO | 2014088012 | A1 | 6/2014 |
| WO | 2015046604 | A1 | 4/2015 |

OTHER PUBLICATIONS

Reinhold Schwalm, UV Coatings: Basics, Recent Developments and New Applications, Elsevier Science, Dec. 2006, p. 115.
Third Party Observation for PCT/KR2018/015429, submitted May 18, 2020, pp. 1-15.

\* cited by examiner

SUPER ABSORBENT POLYMER AND METHOD FOR PREPARING SAME

CROSS-REFERENCE TO RELATED APPLICATIONS

The present application is a national phase entry under 35 U.S.C. § 371 of International Application No. PCT/KR2018/015429 filed on Dec. 6, 2018, which claims the benefit of Korean Patent Application No. 10-2018-0007384 filed on Jan. 19, 2018, the disclosures of which are incorporated herein by reference in their entirety.

TECHNICAL FIELD

The present disclosure relates to a super absorbent polymer having a high water content and a method for preparing the same.

BACKGROUND ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for production of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

As a preparation process for such super absorbent polymers, a process by a reverse phase suspension polymerization and a process by a solution polymerization have been known.

Preparation of the super absorbent polymer by the solution polymerization further includes a thermal polymerization method in which hydrogel polymer is polymerized while being broken and cooled in a kneader equipped with a plurality of shafts, and a photo-polymerization method in which an aqueous solution at a high concentration is irradiated with UV rays on a belt to be polymerized and dried at the same time.

In addition, various post-treatment processes such as surface crosslinking and foaming, etc. for improving physical properties related to absorption, such as absorption capacity and absorption rate of the super absorbent polymer are known. In each process, a method of adding various additives to achieve each purpose is known.

The super absorbent polymer is generally prepared as a dry powder having a certain size through processes such as drying, pulverization, and size-sorting.

By the way, such a dry powder is electrostatically charged which may cause process problems, and in the process of preparing a super absorbent polymer, or in subsequent processes such as diaper production or processing, clogging phenomenon may occur in a bag filter, etc. In the process of pneumatic transfer for a subsequent process, crushing occurs, which may cause a problem that physical properties are deteriorated.

In particular, recently, in connection with the occurrence of respiratory diseases caused by fine particles, health problems of human resources who are put in the preparation process of the super absorbent polymer have also become a big issue.

Therefore, there is a need for research on a method of preparing a super absorbent polymer capable of solving the above-mentioned problems.

SUMMARY OF THE INVENTION

Technical Problem

It is an object of the present disclosure to provide a super absorbent polymer having a relatively high water content compared to a conventional one and a method for preparing the same.

Technical Solution

Provided herein is a method for preparing a super absorbent polymer, comprising:
A) a step of performing crosslinking polymerization of a water-soluble ethylenically unsaturated monomer having an acidic group of which at least a part is neutralized, in the presence of a polymerization initiator and an internal crosslinking agent to form a hydrogel polymer;
B) a step of drying, pulverizing and size-sorting the hydrogel polymer to form a base polymer powder;
C) a step of surface-crosslinking the base polymer powder through heat treatment in the presence of a surface crosslinking agent to form super absorbent polymer particles; and
D) a wetting step of exposing the super absorbent polymer particles under conditions of a relative humidity of 50 RH % or more and less than 80 RH % and a temperature of 40° C. or more and less than 80° C.

Also, provided herein is a super absorbent polymer comprising a surface crosslinking resin in which a water-soluble ethylenically unsaturated monomer having an acidic group of which at least a part is neutralized, is polymerized and crosslinked by an internal crosslinking agent, and which has a surface crosslinking layer modified by a surface crosslinking agent, wherein the super absorbent polymer has a water content of 0.1% by weight to 10% by weight.

Advantageous Effects

According to the present disclosure, it is possible to prepare a super absorbent polymer having a relatively high water content compared to the conventional one, but having no deterioration in physical properties related to absorption.

DETAILED DESCRIPTION OF THE EMBODIMENTS

A method for preparing a super absorbent polymer according to one aspect of the present disclosure, comprises:
A) a step of performing crosslinking polymerization of a water-soluble ethylenically unsaturated monomer having an acidic group of which at least a part is neutralized, in the presence of a polymerization initiator and an internal crosslinking agent to form a hydrogel polymer;
B) a step of drying, pulverizing and size-sorting the hydrogel polymer to form a base polymer powder;

C) a step of surface-crosslinking the base polymer powder through heat treatment in the presence of a surface crosslinking agent to form super absorbent polymer particles; and D) a wetting step of exposing the super absorbent polymer particles under conditions of a relative humidity of 50 RH % or more and less than 80 RH % and a temperature of 40° C. or more and less than 80° C.

Also, the super absorbent polymer can be prepared by the above-mentioned method.

The terms as used herein are used only to explain illustrative embodiments, and are not intended to limit the present disclosure. A singular expression includes a plural expression unless clearly meaning otherwise. It should be understood that the terms such as "comprise" or "have" as used herein are intended to designate the presence of stated features, numbers, steps, constitutional elements, or combinations thereof, but do not preclude the existence or addition of one or more other features, numbers, steps, constitutional elements or combinations thereof.

Further, in the present disclosure, in case a layer or an element is mentioned to be formed "on" or "above" another layer or element, it means that the layer or element is directly formed on the other layer or element, or it means that another layer or element may be additionally formed between layers or on a subject or substrate.

Since a variety of modification may be made to the present disclosure and there may be various forms of the present disclosure, specific examples are illustrated and will be described in detail below. However, it should be understood that this is not intended to limit the present disclosure to particular forms disclosed herein, and the invention compasses all modifications, equivalents, or alternatives falling within the spirit and technical scope of the present disclosure.

Hereinafter, a super absorbent polymer and a method for preparing the same according to specific embodiments of the present disclosure will be described in more detail.

In the super absorbent polymer, centrifugal retention capacity, absorption under pressure and absorption rate are evaluated as important physical properties. Thus, conventionally, a method of forming a large number of pores inside the super absorbent polymer so that water can be absorbed quickly, or a method of reducing the particle size of the super absorbent polymer, etc. are known.

However, since the super absorbent polymer is prepared in the form of a fine dry powder, it is possible to cause problems with the process itself during the preparation process, or several problems related to the health of the allocated human resources as described above.

To solve these problems, it is necessary to increase the water content of the super absorbent polymer particles produced in the form of fine dry powder, and adjust it to a specific range. In the process of increasing the water content, agglomeration between fine particles occurs, resulting in aggregate particles having relatively large size, and thereby, there was a problem that various physical properties related to absorption are deteriorated.

The present inventors have found that the hydrogel polymer formed by polymerization and internal crosslinking reaction is dried, pulverized, classified and subjected to surface crosslinking, and then, a specific step is added to the super absorbent polymer having the surface crosslinked layer formed, and thereby, agglomeration between fine particles does not occur even while having a relatively high water content compared to the existing super absorbent polymer, and it does not substantially contain large sized aggregate particles. On the basis of these findings, the present disclosure has been completed.

Hereinafter, the super absorbent polymer of the present disclosure and the preparation method thereof will be described in detail.

For reference, as used herein, "polymer" means the polymerized state of the ethylenically unsaturated monomer, and may include all water content ranges or particle size ranges. Among the polymers, those having water content of about 40% by weight or more after polymerized and before dried may be designated as hydrogel polymer.

And, "base polymer" or "base polymer powder" means the powder form of polymer made by drying and pelverizing.

The method for preparing a super absorbent polymer according to one aspect of the present disclosure, comprises:

A) a step of performing crosslinking polymerization of a water-soluble ethylenically unsaturated monomer having an acidic group of which at least a part is neutralized, in the presence of a polymerization initiator and an internal crosslinking agent to form a hydrogel polymer;

B) a step of drying, pulverizing and size-sorting the hydrogel polymer to form a base polymer powder;

C) a step of surface-crosslinking the base polymer powder through heat treatment in the presence of a surface crosslinking agent to form super absorbent polymer particles; and D) a wetting step of exposing the super absorbent polymer particles under conditions of a relative humidity of 50 RH % or more and less than 80 RH % and a temperature of 40° C. or more and less than 80° C.

Hereinafter, the present disclosure will be described in detail according to each step.

In the method of preparing a super absorbent polymer according to one embodiment of the present disclosure, first, a monomer composition including an ethylenically unsaturated monomer having an acidic group wherein at least a part of the acidic group is neutralized, a polymerization initiator, and an internal crosslinking agent is polymerized to form a hydrogel polymer.

The ethylenically unsaturated monomer may have an acidic group, wherein at least a part of the acidic group is neutralized. Preferably, those in which the monomer is partially neutralized with an alkaline substance such as sodium hydroxide, potassium hydroxide, ammonium hydroxide or the like can be used. In this case, the degree of neutralization of the ethylenically unsaturated monomer may be about 40 mol % to about 95 mol %, or about 40 mol % to about 80 mol %, or about 45 mol % to about 75 mol %. The range of the degree of neutralization may vary depending on the final physical properties. However, an excessively high degree of neutralization causes the neutralized monomers to be precipitated, and thus polymerization may not readily occur, whereas an excessively low degree of neutralization not only greatly deteriorates the absorption capacity of the polymer, but also endows the polymer with hard-to-handle properties, like elastic rubber.

Preferably, the ethylenically unsaturated monomer is a compound represented by the following Chemical Formula 1:

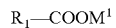 [Chemical Formula 1]

in the Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the ethylenically unsaturated monomer includes one or more selected from the group consisting of acrylic acid, methacrylic acid, and monovalent metal salts, divalent metal salts, ammonium salts, and organic amine salts of these acids.

In addition, the concentration of the ethylenically unsaturated monomer in the monomer composition may be properly controlled in consideration of a polymerization time and reaction conditions, and the concentration may be preferably about 20% by weight to about 90% by weight, or about 40% by weight to about 70% by weight. These concentration ranges may be advantageous for adjusting the pulverization efficiency during pulverization of the polymer which is a subsequent process, without needing to remove unreacted monomers after polymerization by using the phenomenon of gel effect occurring in the polymerization reaction of the highly concentrated aqueous solution. However, when the concentration of the monomer is excessively low, the yield of the super absorbent polymer may be lowered. On the contrary, if the concentration of the monomer is excessively high, it may arise process problems, for example, a part of the monomers may be precipitated, or the pulverization efficiency may be lowered during pulverization of the polymerized hydrogel polymer, etc., and the physical properties of the super absorbent polymer may be deteriorated.

Meanwhile, in the monomer composition, a polymerization initiator commonly used for the preparation of a super absorbent polymer can be included. As a non-limiting example, the polymerization initiator may be a thermal polymerization initiator or a photo-polymerization initiator, depending on a polymerization method. However, even in the case of performing the photo-polymerization method, a certain amount of heat is generated by ultraviolet irradiation or the like. Further, a certain amount of heat may be generated with the progress of exothermic polymerization reaction. Therefore, the thermal polymerization initiator may be further included.

Here, as the photo-polymerization initiator, for example, one or more compounds selected from the group consisting of benzoin ether, dialkyl acetophenone, hydroxyl alkylketone, phenyl glyoxylate, benzyl dimethyl ketal, acyl phosphine and α-aminoketone may be used. In particular, as the specific example of acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may be incorporated herein by reference.

Further, as the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), and the like. Further, examples of the azo-based initiator may include 2,2-azobis-(2-amidinopropane)dihydrochloride, 2,2-azobis-(N,N-dimethylene) isobutyramidine dihydrochloride, 2-(carbamoylazo)isobutylonitrile, 2,2-azobis[2-(2-imidazolin-2-yl)propane] dihydrochloride, 4,4-azobis-(4-cyanovaleric acid) and the like. More various thermal polymerization initiators are well disclosed in "Principle of Polymerization" written by Odian, (Wiley, 1981), p 203, which may be incorporated herein by reference.

Such polymerization initiator may be added at a concentration of about 0.001% by weight to 1% by weight with respect to the monomer composition. That is, if the concentration of the polymerization initiator is too low, the polymerization rate becomes low and a large amount of residual monomers may be extracted from the final product, which is not preferable. On the contrary, if the concentration of the polymerization initiator is too high, a polymer chain making up a network may become short, and thus, the physical properties of polymer may be degraded such as increase in the content of water-soluble components and decrease in absorbency under pressure, which is not preferable.

Meanwhile, the monomer composition includes an internal crosslinking agent to improve physical properties of the polymer by polymerization of the water-soluble ethylenically unsaturated monomer. The crosslinking agent is used for internal crosslinking of the hydrogel polymer, and is used separately from a surface crosslinking agent ("crosslinking agent") to crosslink the surface of the hydrogel polymer.

As the internal crosslinking agent, any compound can be used without particular limitation as long as it enables introduction of a crosslink bond during polymerization of the water-soluble ethylenically unsaturated monomer. As a non-limiting example, the internal crosslinking agent may include multifunctional crosslinking agents, such as N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

Such an internal crosslinking agent may be used at about 1,000 ppmw to about 10,000 ppmw based on the monomer composition, or may be added at a concentration of about 0.001% by weight to about 1% by weight based on the monomer composition.

When the concentration of the internal crosslinking agent is too low, the absorption rate of the polymer is lowered and the gel strength may be weakened, which is thus not preferable. Conversely, when the concentration of the internal crosslinking agent is too high, the absorption capacity of the polymer is lowered, which may be undesirable as an absorber.

Meanwhile, the crosslinking polymerization of the monomer composition may be performed in the presence of a foaming agent. The foaming agent may be decomposed to form pores during polymerization and crosslinking reactions.

As a non-limiting example, the foaming agent may include one or more compounds selected from the group consisting of sodium bicarbonate, sodium carbonate, potassium bicarbonate, potassium carbonate, calcium bicarbonate, calcium bicarbonate, magnesium bicarbonate, magnesium carbonate, azodicarbonamide (ADCA), dinitroso pentamethylene tetramine (DPT), p,p'-oxybis(benzenesulfonyl hydrazide) (OBSH), p-toluenesulfonyl hydrazide (TSH), sucrose stearate, sucrose palmitate, and sucrose laurate.

The foaming agent is preferably present at about 1,000 to 3,000 ppmw in the monomer composition. Specifically, the foaming agent may be present at about 1,000 ppmw or more, or 1,100 ppmw or more, or 1,200 ppmw or more; and 3,000 ppmw or less, or 2,500 ppmw or less, or 2,000 ppmw or less in the monomer composition.

In addition, the monomer composition may further include additives such as a thickener, a plasticizer, a preservation stabilizer, an antioxidant, etc., if necessary.

Such monomer composition can be prepared in the form of a solution in which raw materials such as the above-described monomer, polymerization initiator, internal cross-linking agent, etc. are dissolved in a solvent. In this case, any usable solvent can be used without limitation in the constitution as long as it can dissolve the above-mentioned raw materials. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method, and the process is not particularly limited. As a non-limiting example, the polymerization method are largely classified into a thermal polymerization and a photo-polymerization according to the type of the polymerization energy source, and the thermal polymerization may be carried out in a reactor like a kneader equipped with agitating spindles and the photo-polymerization may be carried out in a reactor equipped with a movable conveyor belt.

As an example, the monomer composition is injected into a reactor like a kneader equipped with the agitating spindles, and thermal polymerization is performed by providing hot air thereto or heating the reactor, thereby obtaining the hydrogel polymer. In this case, the hydrogel polymer, which is discharged from the outlet of the reactor according to the type of agitating spindles equipped in the reactor, may be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of about 2 mm to about 50 mm may be generally obtained.

As another example, when the photo-polymerization of the monomer composition is performed in a reactor equipped with a movable conveyor belt, a sheet-shaped hydrogel polymer may be obtained. In this case, the thickness of the sheet may vary depending on the concentration of the monomer composition injected thereto and the injection speed, and the polymer sheet is preferably controlled to have typically a thickness of about 0.5 cm to about 5 cm in order to secure the production speed or the like while enabling a uniform polymerization of the entire sheet.

The hydrogel polymer obtained by the above-mentioned method may have a water content of about 40% by weight to about 80% by weight. The "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C. and then the temperature may be maintained at about 180° C., and the total drying time may be set to about 20 minutes, including about 5 minutes for the temperature rising step.

Meanwhile, the method for preparing the super absorbent polymer includes a step of drying the hydrogel polymer formed through the above-mentioned step.

In this case, in order to increase the efficiency of the drying step, a step of coarsely pulverizing the hydrogel polymer may be further carried out before drying, if necessary.

As a non-limiting example, a usable pulverizing machine may include, for example, a vertical pulverizer, a turbo cutter, a turbo grinder, a rotary cutter mill, a cutter mill, a disc mill, a shred crusher, a crusher, a chopper, a disc cutter, and the like.

In this case, the coarse pulverization may be performed so that the hydrogel polymer has a particle size of about 2 mm to about 10 mm. That is, to increase the drying efficiency, the hydrogel polymer is preferably pulverized to have a particle size of mm or less. However, excessive pulverization may cause agglomeration between particles, and therefore the hydrogel polymer is preferably pulverized to have a particle size of about 2 mm or more.

And, when the coarse pulverization is performed before the drying of the hydrogel polymer in this way, the polymer is in the state of high water content and thus, the phenomenon that it sticks to the surface of the pulverizing device may occur. In order to minimize this phenomenon, during the coarse pulverization, steam, water, a surfactant, an anti-agglomeration agent for fine particles such as clay or silica, etc.; a thermal polymerization initiator such as a persulfate-based initiator, an azo-based initiator, hydrogen peroxide, and ascorbic acid; or a crosslinking agent such as an epoxy-based crosslinking agent, a diol-based crosslinking agent, a crosslinking agent including a 2-functional or a 3 or more-functional acrylate, or a mono-functional compound including a hydroxyl group may be added, if necessary.

Meanwhile, the drying of the hydrogel polymer immediately after coarse pulverization or polymerization may be performed at a temperature of about 120° C. to about 250° C., about 150° C. to about 200° C., or about 160° C. to about 180° C. (In this case, the temperature may be defined as the temperature of the heating medium provided thereto for drying, or the internal temperature of the drying reactor including the heating medium and the polymer during the drying process.) If the drying temperature is low, and therefore the drying time becomes long, physical properties of the final polymer may be deteriorated. In order to prevent this problem, the drying temperature is preferably about 120° C. or higher. In addition, when the drying temperature is higher than necessary, only the surface of the hydrogel polymer is dried, and thus there is a concern that a large amount of fine particles are generated during the subsequent pulverization process, and the physical properties of the final polymer may be deteriorated. In order to prevent this problem, therefore, the drying temperature is preferably about 250° C. or less.

In this case, the drying time in the drying step is not particularly limited, but may be controlled to about 20 to about 90 minutes at the above drying temperature, in consideration of the process efficiency.

A drying method for the drying may also be applied without limitation in the constitution as long as it is a method commonly used in the drying process of the hydrogel polymer. Specifically, the drying step may be carried out by methods such as hot air supply, infrared irradiation, microwave irradiation or ultraviolet irradiation.

The polymer dried by the above method may exhibit a water content of about 0.1% by weight to about 10% by weight, preferably about 0.1% by weight to about 5% by weight, more preferably about 0.1% by weight to about 1% by weight. If the water content of the dried polymer is too low, production costs may be increased due to excessive drying and degradation of the crosslinked polymer may occur which is not advantageous. And, if the water content of the polymer is too high, the processability may be lowered in the subsequent pulverization or surface crosslinking steps, and defects may occur, which is not preferable.

Subsequently, a step of pulverizing the dried polymer is performed. The pulverization is for optimizing the surface area of the dried polymer, and may be performed so that the pulverized polymer has a particle size of about 150 μm to about 850 μm, specifically about 150 μm or more and about 850 μm or less.

In this case, a pulverization device may include a pin mill, a hammer mill, a screw mill, a roll mill, a disc mill, a jog mill, or the like, which is generally used. In order to manage physical properties of the super absorbent polymer finally produced, a step of selectively size-sorting polymer particles having a particle size of about 150 μm to about 850 μm from the polymer particles obtained through the pulverization step may be further performed.

The step of surface-crosslinking the polymer pulverized by the above-described steps, e.g., a base polymer powder, using a surface crosslinking agent, is performed.

The surface crosslinking is a step of forming a super absorbent polymer having further improved physical properties by inducing crosslinking reaction of the surface of the pulverized polymer in the presence of the surface crosslinking agent. A surface crosslinking layer may be formed on the surface of the pulverized polymer particles by the surface-crosslinking.

The surface modification may be performed by a general method of increasing crosslinking density of the surface of the polymer particles, and for example, a solution including the surface crosslinking agent is mixed with the pulverized polymer to allow crosslinking reaction.

Herein, the surface crosslinking agent is a compound that may be reacted with the functional group of the polymer, and the constitution thereof is not particularly limited.

However, as a non-limiting example, it may be preferable to include one or more selected from the group consisting of an alkylene carbonate having 3 to 10 carbon atoms, a polyhydric alcohol having 2 to 10 carbon atoms, an amino alcohol having 1 to 10 carbon atoms, an oxetane compound having 2 to 10 carbon atoms, an epoxy compound having 2 to 10 carbon atoms, a polyvalent amine compound having 2 to 10 carbon atoms, calcium hydroxide, magnesium hydroxide, aluminum hydroxide, iron hydroxide, calcium chloride, magnesium chloride, aluminum chloride, and iron chloride.

Specific examples of the alkylene carbonate compound may include 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxepan-2-one, and the like.

According to another embodiment of the present disclosure, the surface crosslinking agent may further include polycarboxylic acid compounds which are random copolymers derived from hydrophilic monomers such as alkoxy polyalkylene glycol mono(meth)acrylate-based monomers, including methoxy polyethylene glycol monomethacrylate (MPEGMAA), etc.; and (meth)acrylate-based monomers, including acrylic acid and (meth)acrylic acid.

Specific examples of the polycarboxylic acid compounds are disclosed in Korean Unexamined Patent Publication No. 2015-0143167, etc.

In this case, a content of the surface crosslinking agent may be properly controlled according to the kind of the crosslinking agent or reaction conditions, and the content is preferably about 0.001 part by weight to about 5 parts by weight, based on 100 parts by weight of the pulverized polymer. If the content of the surface crosslinking agent is too low, surface-crosslinking may not be properly performed, which may cause a deterioration in physical properties of the final polymer. On the contrary, if the surface crosslinking agent is excessively used, excessive surface-crosslinking reaction may occur, leading to deterioration in absorption capacity of the polymer, which is not preferable.

Further, When the surface crosslinking solution is added, water may be further added. The addition of the surface crosslinking agent and water together may include more uniform dispersion of the surface crosslinking agent, and further optimize the penetrating depth of the surface crosslinking agent into the polymer particles. Considering these purposes and effects, the amount of water added together with the surface crosslinking agent may be controlled to about 0.5 parts by weight to about 10 parts by weight, based on 100 parts by weight of the pulverized polymer.

Meanwhile, the surface-crosslinking may be performed at a temperature of about 180° C. to about 250° C. When the surface-crosslinking is performed at the above temperature, the surface-crosslinking density can be increased which is thus preferable. More preferably, the surface-crosslinking may be performed at about 190° C. or more, and about 240° C. or less, about 230° C. or less, about 220° C. or less, about 210° C. or less, or about 200° C. or less.

Further, the surface-crosslinking reaction may be performed for about 50 minutes or longer. That is, in order to induce the minimal surface crosslinking reaction and to prevent a reduction in physical properties due to deterioration of the polymer particles during excessive reaction, the surface-crosslinking reaction may be performed under the above-described conditions. The reaction may be performed for about 120 minutes or shorter, about 100 minutes or shorter, or about 60 minutes or shorter.

And, after the surface-crosslinking, a wetting step of exposing the super absorbent polymer particles under conditions of a relative humidity of 50 RH % or more and less than 80 RH % and a temperature of 40° C. or more and less than 80° C. is performed.

As described above, since the super absorbent polymer in the form of a dried fine powder can cause some problems, it is necessary to further increase the water content.

Conventionally, in order to increase the water content, methods such as adding water or other additives to the super absorbent polymer particles having the surface cross-linked layer formed, or after spraying in a spray form and aging, adjusting the water content while evaporating water again, have been used.

However, in the case of these methods, it is difficult to accurately adjust the water content, some particles are re-agglomerated in the process of increasing the water content to form large-sized aggregate particles, which causes a problem that absorption-related physical properties are significantly reduced.

Thus, in the method for preparing a super absorbent polymer of the present disclosure, the water content is increased by exposing the super absorbent polymer particles having a surface crosslinked layer under the conditions of relatively high humidity and temperature for a certain period of time.

As described above, when the surface-crosslinked super absorbent polymer particles are exposed to specific conditions to increase the water content, it is advantages in that the water content of the super absorbent polymer particles can be accurately adjusted by adjusting the humidity or exposure time. Further, the super absorbent polymer particles do not come into direct contact with water during the wetting process, so that aggregate particles are not formed, which does not lead to deterioration in physical properties.

The wetting step may be performed differently depending on the targeted water content range, in the range of about 1 minute to about 15 minutes, preferably about 1 minute to about 10 minutes. If the exposure time is too short, there is a problem that it is difficult to increase the water content. If the exposure time is too long, a problem may occur in the surface crosslinking layer of the super absorbent polymer, and the absorption-related physical properties may be deteriorated.

And, from the viewpoint of adjusting the water content and maintaining the physical properties of the surface crosslinking layer, the above-described wetting step may be performed under conditions of a relative humidity of about 50 RH % or more and about 75 RH % or less, more preferably, a relative humidity of about 60 RH % or more and about 75 RH % or less, and a temperature of about 40° C. or more and about 75° C. or less, more preferably, a temperature condition of about 60° C. or more and about 75° C. or less.

The super absorbent polymer prepared according to the above-described preparation method may have excellent absorption-related physical properties, and has a relatively high water content compared to the existing super absorbent polymer, and thus, it is possible to previously prevent the occurrence of problems resulting from the super absorbent polymer which is a fine dry particle.

The super absorbent polymer according to one aspect of the present disclosure comprises,
a surface crosslinking resin in which a water-soluble ethylenically unsaturated monomer having an acidic group of which at least a part is neutralized, is polymerized and crosslinked by an internal crosslinking agent, and which has a surface crosslinking layer modified by a surface crosslinking agent,
wherein the super absorbent polymer has a water content of 0.1% by weight to 10% by weight.

The ethylenically unsaturated monomer may be, preferably, a compound represented by the following Chemical Formula 1 as described in the production method.

$$R^1\text{—COOM}^1 \qquad \text{[Chemical Formula 1]}$$

in the Chemical Formula 1,
$R_1$ is an alkyl group having 2 to 5 carbon atoms containing an unsaturated bond, and
$M^1$ is a hydrogen atom, a monovalent or divalent metal, an ammonium group or an organic amine salt.

Preferably, the ethylenically unsaturated monomer includes one or more selected from the group consisting of acrylic acid, methacrylic acid, and monovalent metal salts, divalent metal salts, ammonium salts, and organic amine salts of these acids.

Here, the ethylenically unsaturated monomer may have an acidic group, wherein at least a part of the acidic group is neutralized. Preferably, those in which the monomer is partially neutralized with an alkaline substance such as sodium hydroxide, potassium hydroxide, ammonium hydroxide or the like can be used. In this case, the degree of neutralization of the ethylenically unsaturated monomer may be about 40 mol % to about 95 mol %, or about 40 mol % to about 80 mol %, or about 45 mol % to about 75 mol %. The range of the degree of neutralization may vary depending on the final physical properties. However, an excessively high degree of neutralization causes the neutralized monomers to be precipitated, and thus polymerization may not readily occur, whereas an excessively low degree of neutralization not only greatly deteriorates the absorption capacity of the polymer, but also endows the polymer with hard-to-handle properties, like elastic rubber.

The water content may vary depending on the purpose of use, and may vary depending on adjustment of the exposure conditions of the wetting step in the preparation process. The water content may be 0.1% by weight or more, preferably about 0.5% by weight or more, more preferably about 1% by weight or more, and 10% by weight or less, preferably about 7% by weight or less, and more preferably about 5% by weight or less.

And, the super absorbent polymer according to one embodiment of the present disclosure includes,
a surface crosslinking polymer having a particle size of about 150 μm or more and less than about 850 μm, wherein the polymer has a content of the aggregates having a particle size of about 850 μm or more of about 1% by weight or less, or about 0.5% by weight or less, or about 0.1% by weight, or may substantially contain no aggregate particles described above, and thus, it is possible to prevent deterioration of absorption-related physical properties resulting from the formation of aggregates.

The super absorbent polymer according to one embodiment of the present disclosure may have a centrifugal retention capacity of about 20 g/g or more, or about 25 g/g or more, preferably about 26 g/g or more, as measured in accordance with EDANA recommended test method WSP 241.2. The upper limit value of the centrifugal retention capacity is not particularly limited, but may be about 50 g/g or less, preferably about 40 g/g or less, or about 35 g/g or less, or about 30 g/g or less.

The centrifugal retention capacity (CRC) was measured according to the EDANA recommended test method WSP 241.3, and can be represented by Equation 1 below:

$$\text{CRC (g/g)} = \{[W2\ (g) - W1\ (g)]/W0\ (g)\} - 1 \qquad \text{[Equation 1]}$$

in the Equation 1,
W0 (g) is the initial weight (g) of the polymer,
W1 (g) is the weight (g) of an apparatus measured after dehydrated at 250 G for 3 minutes using a centrifuge, without the polymer, and
W2 (g) is the weight (g) of an apparatus including the polymer, measured after immersed in a 0.9 wt % saline solution at room temperature for 30 minutes, and then dehydrated at 250 G for 3 minutes using a centrifuge.

Further, according to another embodiment of the present disclosure, the super absorbent polymer may have an absorption under pressure (AUP) at 0.7 psi of about 15 g/g or more, preferably about 19 g/g or more, or about 20 g/g or more. The upper limit value thereof is also not particularly limited, but may be about 40 g/g or less, preferably about 30 g/g or less, or about 27 g/g or less, or about 25 g/g or less.

Hereinafter, the actions and effects of the present disclosure will be described in more detail by way of specific examples. However, these examples are presented for illustrative purposes only, and the scope of the present disclosure is not determined thereby.

EXAMPLE

Preparation Example: Preparation of Super Absorbent Polymer

Preparation Example 1

100 parts by weight of acrylic acid was mixed with 0.6 parts by weight of polyethylene glycol diacrylate (weight average molecular weight: about 500 g/mol) and 0.05 parts by weight of hexanediol diacrylate as an internal crosslinking agent, and 0.01 part by weight of IRGACURE 819 as a photoinitiator to prepare a monomer solution. Then, while continuously feeding the monomer solution by a metering pump, 160 parts by weight of a 24 wt % aqueous solution of sodium hydroxide was continuously subjected to line mixing to prepare a monomer aqueous solution. At this time, after confirming that the temperature of the monomer aqueous solution raised to about 72° C. or more by neutralization heat, the solution was left until it was cooled to 40° C.

When the temperature was cooled to 40° C. 0.1 parts by weight of sodium bicarbonate as a foaming agent was added to the aqueous monomer solution, and simultaneously, 6 parts by weight of a 2 wt % sodium persulfate aqueous solution was added.

The solution was poured into a tray in the form of Vat (width 15 cm×length 15 cm) installed in a square polymerization reactor on which a light irradiation device was mounted, and of which inside is preheated to 80° C., and light irradiation was conducted to photoinitiate. It was confirmed that gel was formed from the surface about 25 seconds after light irradiation, and that a polymerization reaction occurred simultaneously with foaming at about 50 seconds, and then, it was additionally reacted for 3 minutes to obtain a hydrogel polymer in the form of a sheet.

The hydrogel polymer in the form of a sheet obtained above was cut into a size of 3 cm×3 cm, and then, chopped while pushing the hydrogel polymer to a perforated panel having a plurality of holes using a screw type extruder equipped inside of a cylindrical pulverizing device.

Then, the pulverized hydrogel polymer was dried in a dryer capable of transferring air volume up and down. Hot air at 180° C. was allowed to flow from the lower side to the upper side for 15 minutes, and to flow from the upper side to the lower side again for 15 minutes, thus uniformly drying the hydrogel.

Subsequently, the dried polymer was pulverized with a pulverizing device and then size-sorted to obtain a base polymer with a size of 150 μm or more and less than 850 μm, and then, 100 parts by weight of the base polymer was mixed with a crosslinking solution containing 4 parts by weight of water, 1 parts by weight of ethylene carbonate and 0.1 parts by weight of the inorganic material ($SiO_2$ having a size within 10 μM in diameter) were mixed, and then subjected to surface crosslinking at 180° C. for 40 minutes. Then, the obtained product was cooled and then size-sorted to obtain surface-crosslinked super absorbent polymer particles having a particle size of 150 to 850 μm.

Preparation Example 2

100 parts by weight of acrylic acid was mixed with 0.4 parts by weight of polyethylene glycol diacrylate (weight average molecular weight: about 500 g/mol) and 0.02 parts by weight of AMA (allyl methacrylate) as an internal crosslinking agent, and 0.01 part by weight of IRGACURE 819 as a photoinitiator to prepare a monomer solution.

The rest of the process was performed in the same manner as in Preparation Example 1 to prepare a base polymer, and then 1 part by weight of ethylene carbonate, 1 part by weight of propylene carbonate, 4.5 parts by weight of water, and 0.1 parts by weight of inorganic material ($SiO_2$ of 200 to 380 μm in diameter) relative to 100 parts by weight of the base polymer were mixed, and subjected to surface crosslinking at 190° C. for 50 minutes. Then, the obtained product was cooled and then size-sorted to obtain surface-crosslinked super absorbent polymer particles having a particle size of 150 to 850 μm.

Preparation Example 3

100 parts by weight of acrylic acid was mixed with 0.5 parts by weight of polyethylene glycol diacrylate (weight average molecular weight: about 500 g/mol) and 0.02 parts by weight of AMA (allyl methacrylate) as an internal crosslinking agent and 0.01 part by weight of IRGACURE 819 as a photoinitiator to prepare a monomer solution.

The rest of the process was performed in the same manner as in Preparation Example 1 to prepare a base polymer, and then 1 part by weight of ethylene carbonate, 1 part by weight of propylene carbonate, 5 parts by weight of water, and 0.1 parts by weight of inorganic material ($SiO_2$ having a size within 10 μm in diameter) relative to 100 parts by weight of the base polymer, and subjected to surface crosslinking at 190° C. for 50 minutes. Then, the obtained product was cooled and then size-sorted to obtain surface-crosslinked super absorbent polymer particles having a particle size of 150 to 850 μm.

Preparation of Super Absorbent Polymer with Increased Water Content 100 g of each super absorbent polymer of the Preparation Examples was put in a thermohygrostat preheated under conditions summarized in Table 1 below, and the water content was increased by exposing it under a high-temperature and high-humidity environment.

However, in the case of Comparative Examples 5-1 to 5-3, 100 g of each super absorbent polymer was sprayed with the amount of water summarized in Table 2 below using a spray type sprayer.

Experimental Example: Measurement of Physical Properties of Each Super Absorbent Polymer Content of Aggregates As described above, the super absorbent polymer with increased water content was size-sorted again, and aggregates having a diameter of 850 μm or more were selected, and the content of aggregates (g) per 100 g of the super absorbent resin was measured.

Water Content

Each super absorbent polymer of the Preparation Examples, Examples, and Comparative Example was placed by 5 g each on an aluminum plate, dried for 10 minutes under conditions of 140° C., and the mass was measured again. The water content (% by weight) was calculated by considering the reduced mass as the amount of water.

Centrifugal Retention Capacity (CRC)

The centrifugal retention capacity was measured based on EDANA recommended test method WSP 241.3. 0.2 g of the prepared super absorbent polymer sample was placed in a teabag and then immersed in a 0.9% saline solution for 30 minutes. Thereafter, dehydration was performed for 3 minutes at a centrifugal force of 250 G (gravity), and the amount of saline solution that was absorbed was measured.

Absorption Under Pressure (AUP)

The absorption under pressure was measured according to EDANA recommended test method WSP 241.3. 0.9 g of the prepared super absorbent polymer sample was put in a cylinder prescribed in EDANA, and a pressure of 0.7 psi was applied with a piston and weight. Thereafter, the amount of a 0.9% saline solution absorbed for 60 minutes was measured.

Absorption Under Load (AUL)

The absorption under load (AUL) was measured as follows. 0.16 g of the super absorbent polymer sample size-sorted into 200 to 600 μm was placed in a cylinder, and a pressure of 0.9 psi was applied using a piston and a weight. Thereafter, the amount of 0.9% saline that was absorbed in 60 min was measured.

SFC: Saline Flow Conductivity)

This saline flow conductivity (SFC) was measured according to the method disclosed in column 16 [0184] to [0189] of U.S. Patent Application Publication No. 2009-0131255.

GBP: Gel Bed Permeability

This gel bed permeability was measured according to the method disclosed in Korean Patent Application No. 10-2014-7018005.

TABLE 1

|  | Relative humidity (RH %) | Temperature (° C) | Exposure time (min) |
|---|---|---|---|
| Preparation Example 1 | — | — | — |
| Example 1-1 | 75 | 70 | 2.5 |
| Example 1-2 | 75 | 70 | 5 |
| Preparation Example 2 | — | — | — |
| Example 2-1 | 75 | 70 | 2.5 |
| Example 2-2 | 75 | 70 | 5 |
| Preparation Example 3 | — | — | — |
| Example 3-1 | 75 | 70 | 2.5 |
| Example 3-2 | 75 | 70 | 5 |
| Example 3-3 | 75 | 70 | 7 |
| Preparation Example 3 | — | — | — |
| Example 4-1 | 50 | 70 | 5 |
| Example 4-2 | 60 | 70 | 5 |
| Example 4-3 | 60 | 70 | 10 |
| Example 4-4 | 75 | 45 | 5 |
| Comparative Example 4-1 | 80 | 70 | 5 |
| Comparative Example 4-2 | 75 | 80 | 5 |

TABLE 2

|  | Amount of water added (g) |
|---|---|
| Preparation Example 2 | — |
| Comparative Example 5-1 | 8 |
| Comparative Example 5-2 | 12 |
| Comparative Example 5-3 | 11 |

TABLE 3

|  | Water content (%) | Increase/ decrease in water content (% point) | Amount of aggregate generated (g/100 g) | CRC (g/g) | 0.7 psi AUP (g/g) | SFC ($10^{-7}$ cm$^3$ · sec/g) | (ΔCRC + ΔAUP) (g/g) |
|---|---|---|---|---|---|---|---|
| Preparation Example 1 | 0.7 | — | — | 26.7 | 23.6 | 92 | — |
| Example 1-1 | 1.5 | 0.8 | 0 | 26.7 | 23.5 | 92 | 0.1 |
| Example 1-2 | 2.9 | 2.2 | 0 | 26.6 | 23.1 | 92 | 0.3 |

|  | Water content (%) | Increase/ decrease in water content (% point) | Amount of aggregate generated (g/100 g) | CRC (g/g) | 0.9 psi AUL (g/g) | GBP (Darcy) | (ΔCRC + ΔAUL) (g/g) |
|---|---|---|---|---|---|---|---|
| Preparation Example 2 | 0.5 | — | — | 29 | 19.2 | 49 | — |
| Example 2-1 | 1.7 | 1.2 | 0 | 28.7 | 19.1 | 47 | 0.2 |
| Example 2-2 | 2.5 | 2 | 0 | 28.8 | 18.7 | 48 | 0.3 |

|  | Water content (%) | Increase/ decrease in water content (% point) | Amount of aggregate generated (g/100 g) | CRC (g/g) | 0.7 psi AUP (g/g) | SFC ($10^{-7}$ cm$^3$ · sec/g) | (ΔCRC + ΔAUP) (g/g) |
|---|---|---|---|---|---|---|---|
| Preparation Example 3 | 0.2 | — | — | 28.7 | 25 | 50 | — |
| Example 3-1 | 1.6 | 1.4 | 0 | 28.5 | 24.8 | 51 | 0.4 |
| Example 3-2 | 2.3 | 2.1 | 0 | 28.3 | 24.7 | 50 | 0.5 |
| Example 3-3 | 3.2 | 3 | 0 | 28.1 | 24.3 | 50 | 0.8 |
| Preparation Example 3 | 0.4 | — | — | 28.5 | 25.2 | 47 | — |
| Example 4-1 | 0.5 | 0.1 | 0 | 28.5 | 25.1 | 46 | 0 |
| Example 4-2 | 1 | 0.6 | 0 | 28.4 | 25.2 | 47 | 0.1 |
| Example 4-3 | 1.3 | 0.9 | 0 | 28.4 | 25 | 47 | 0.2 |
| Example 4-4 | 0.7 | 0.3 | 0 | 28.5 | 25.1 | 48 | 0.1 |
| Comparative Example 4-1 | 3.2 | 2.8 | 4.2 | 27.5 | 24.7 | 42 | 0.6 |
| Comparative Example 4-2 | 2.5 | 2.1 | 1.2 | 27.8 | 24.9 | 45 | 0.4 |

TABLE 3-continued

| | Water content (%) | Increase/ decrease in water content (% point) | Amount of aggregate generated (g/100 g) | CRC (g/g) | 0.9 psi AUL (g/g) | GBP (Darcy) | (ΔCRC + ΔAUL) (g/g) |
|---|---|---|---|---|---|---|---|
| Preparation Example 2 | 0.4 | — | — | 31.6 | 20.6 | 55 | — |
| Comparative Example 5-1 | 2.2 | 1.8 | 8 | 30.7 | 19.1 | 50 | 1.2 |
| Comparative Example 5-2 | 3.2 | 2.8 | 12 | 28.5 | 17.1 | 48 | 3.3 |
| Comparative Example 5-3 | 3.3 | 2.9 | 11 | 28.4 | 17.5 | 45 | 3.2 |

Referring to Table 3, it can be clearly confirmed that the super absorbent polymer according to one embodiment of the present disclosure does not generate aggregates even though the water content is effectively increased through a wetting process.

What is claimed is:

1. A method for preparing super absorbent polymer particles, comprising:
A) performing crosslinking polymerization of a water-soluble ethylenically unsaturated monomer having an acidic group of which at least a part is neutralized, in the presence of a polymerization initiator and an internal crosslinking agent to form a hydrogel polymer;
B) forming a base polymer powder by drying, pulverizing, and size-sorting the hydrogel polymer;
C) forming super absorbent polymer particles by surface-crosslinking the base polymer powder through heat treatment in the presence of a surface crosslinking agent; and
D) performing a wetting step for 1 to 5 minutes after surface-crosslinking for adjusting water content of the super absorbent polymer particles through the wetting step after surface-crosslinking
by exposing all the super absorbent polymer particles obtained in Step C under conditions of a relative humidity of 50 RH % or more and less than 80 RH % and a temperature of 60° C. or more and less than 75° C., to produce
the super absorbent polymer particles with a water content of 0.1% to 5% by weight; and
a particle size of a particle size of 150 μm to 850 μm;
and a content of aggregates 1% by weight or less having a particle size of 850 μm or more.

2. The preparation method according to claim 1,
wherein the water-soluble ethylenically unsaturated monomer is a compound represented by the following Chemical Formula 1:

$R_1$—COOM$^1$      [Chemical Formula 1]

wherein in the Chemical Formula 1,
$R_1$ is an alkyl group having 2 to 5 carbon atoms containing an unsaturated bond, and $M^1$ is a hydrogen atom, a monovalent or divalent metal, an ammonium group or an organic amine salt.

3. The preparation method according to claim 1,
wherein the internal crosslinking agent includes one or more of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate.

4. The preparation method according to claim 1,
wherein the internal crosslinking agent is used at 1,000 ppmw to 10,000 ppmw relative to a weight of the water-soluble ethylenically unsaturated monomer.

5. The preparation method according to claim 1,
wherein the internal crosslinking agent includes one or more of an alkylene carbonate having 3 to 10 carbon atoms, a polyhydric alcohol having 2 to 10 carbon atoms, an amino alcohol having 1 to 10 carbon atoms, an oxetane compound having 2 to 10 carbon atoms, an epoxy compound having 2 to 10 carbon atoms, a polyvalent amine compound having 2 to 10 carbon atoms, calcium hydroxide, magnesium hydroxide, aluminum hydroxide, iron hydroxide, calcium chloride, magnesium chloride, aluminum chloride, or iron chloride.

6. The preparation method according to claim 1,
wherein the surface crosslinking is performed at a temperature of 180° C. to 250° C.

7. The preparation method according to claim 1,
wherein the wetting is performed under conditions of a relative humidity of 50 RH % or more and 75 RH % or less.

* * * * *